United States Patent Office.

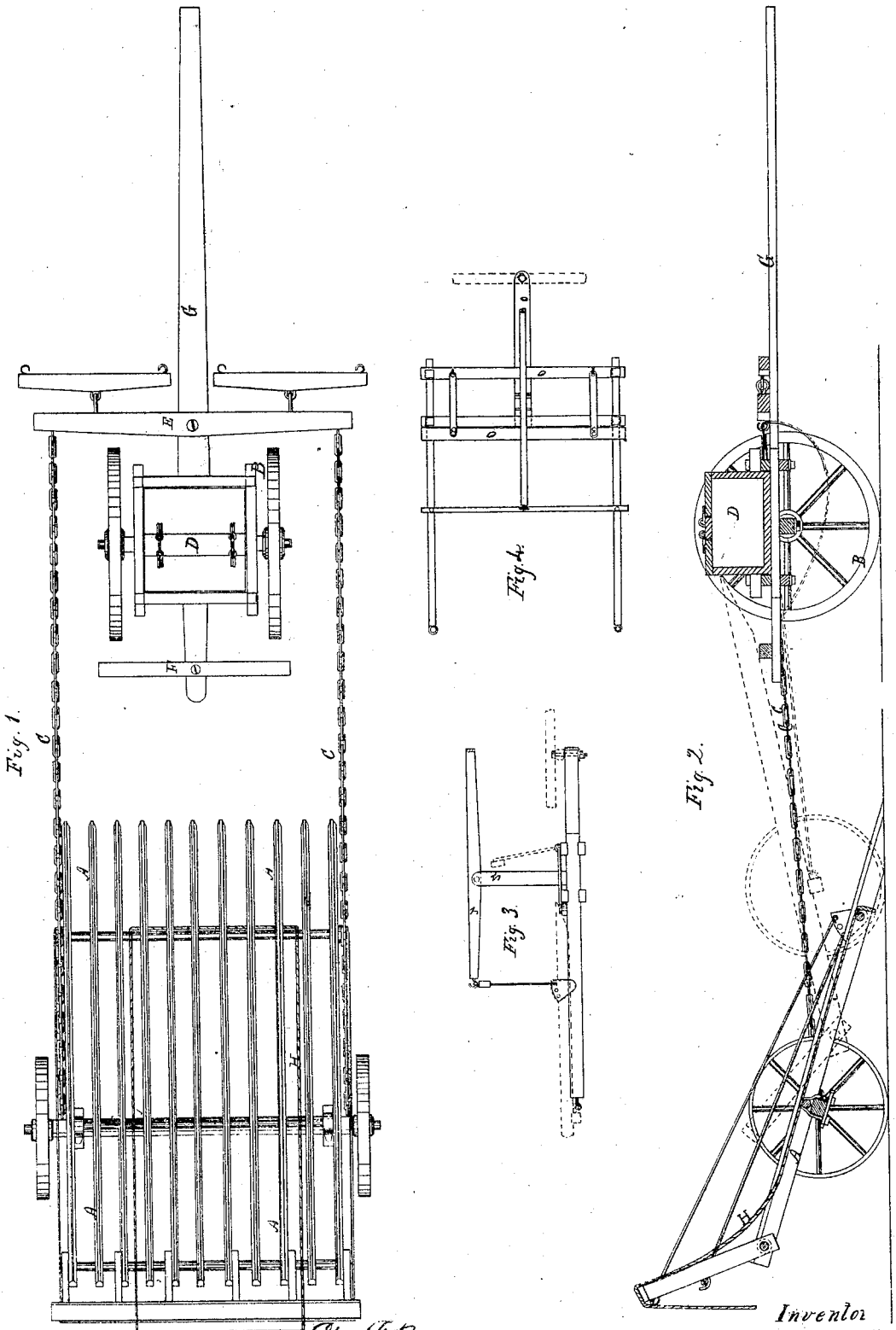

W. T. NICHOLS, OF RUTLAND, VERMONT.

*Letters Patent No. 73,747, dated January 28, 1868.*

IMPROVEMENT IN HAY-RAKERS AND LOADERS.

*The Schedule referred to in these Letters Patent and making part of the same.*

Be it known that I, W. T. NICHOLS, of Rutland, in the county of Rutland, and State of Vermont, have invented a new and useful implement of husbandry and labor for the purpose of raking and loading hay and grain upon a wagon, which, as it combines both hay-rake and hay-wagon in one entire organism, I denominate a Hay-Rake Wagon; and I do hereby declare that the following is a full, clear, and exact description of the construction and operation of the same, reference being had to the annexed drawings, making part of this specification—

Figure 1 being a top view,
Figure 2 being a vertical section.

A, rake; B, draught-carriage; C, connecting-chains; D, tool-box and seat; E, front double whiffle-tree; F, rear double whiffle-tree; G, tongue; H, unloading-rope; O, coupling-frame; N, hoisting-lever; K, clapper.

The design of the invention is to rake and load hay and grain with the same implement, with the same operation, at the same time, and, in addition, so load it that, by means of a part of the implement, the entire load can be taken off and placed on the stack or in the barn by means of horse-power, at one operation, without using a pitchfork of any kind.

The construction is as follows: Four ordinary wagon-wheels are used. The two large wheels are placed in front upon an axle, say five feet long, and upon this axle is placed a square frame, with a long tongue, G, extending through it, and in front of the wheels a long double whiffle-tree, in the ordinary manner, upon the tongue, with hooks in the end of the same, the small whiffle-trees being placed immediately upon the double whiffle-tree. Upon the rear end of the tongue another cross-bar is placed, similar to the above-described double whiffle-tree, and attached to the rear end of the tongue by a bolt, and is intended to sustain one end o the rake while the rake is being used as a wagon. Upon the top of the above-described frame, between the front wheels, is a box, used as a seat for the operator, and also to carry any tools, chains, ropes, or other articles required.

The rake A consists of a series of teeth or slides, twenty feet long, more or less, by two inches thick and six inches wide, more or less, arranged parallel to each other, at proper distances apart, the edges upwards and bevelled, and the whole duly fastened together by iron rods passing through wooden blocks between each tooth or slide, and the width of the rake is regulated by the choice of the operator. The rake above set forth is mounted upon a long axle-tree at a point, say, of one-third of the length of the rake from the rear end, and is fastened to the axle-tree by bolts or otherwise. Upon the rear end and sides of the rake are back and side stays, as shown in the accompanying drawings, and the rake is carried by the two small wheels. Between the rake and wheels, upon each side, is a hook fastened to the axle, and from these hooks ropes or chains C pass to the hooks in the long front double whiffle-tree, and are fastened to the same. A continuous rope, H, or a rope tied with a single knot, is thrown over the front end of the rake, passing underneath the same, thence up the teeth to the rear end, thence over the back-stays, and allowed to hang in that position. Additional ropes may be used, if desired, or they may be cut apart and used with hooks or rings. The effectiveness of the invention can be increased by a corresponding increase of the size, either by making it wider, with the teeth or slides longer, or by making it longer, hanging the slides upon a joint at the axle, and letting the rear end rest upon pivoted wheels at the rear end, or by pivoting a wheel under the centre axle.

The method of operation is as follows: After the unloading-rope H has been adjusted, as above set forth, the operator, with the front end of the rake resting upon the ground, drives forward, the hay is swept up by the rake, and slides in due time to the rear end. When a sufficient load is thus upon the rake, he halts his team, raises the front end of the rake above the rear double whiffle-tree, backs the team, letting the rake rest upon the rear double whiffle-tree, shortens the connecting-chains at the hooks upon the front double whiffle-tree, and thus the rake becomes a wagon, whereupon the operator at once drives his load to the barn or stack. Upon arrival at the point of unloading, the connecting-chains are thrown off, the unloading-rope H is drawn forward and out of the front teeth, and the rear end of the rope is brought over the back-stays, and the ends being brought together are hooked into the pulley-block, and the entire load is hoisted into position.

As a more expensive though more convenient connecting arrangement than the chain C, the coupling-frame O, sufficiently shown in the accompanying drawings, may be used, in which case the lever N can be used for hoisting the front end of the rake, and the operation of loading and unloading is substantially the same, whether the chains or frame are used, and either may be used as convenience or choice shall dictate.

Having stated the design, construction, and operation of my invention, I claim—

1. A combined hay-rake and hay-wagon, in which the rake is made the wagon-bed, whereby the separate uses and purposes of a hay-rake and hay-wagon can be accomplished by one and the same machine, using the same for either purpose at will, and by which hay and grain can be raked and loaded at the same time without any intermediate appliance other than the rake itself, substantially as set forth and described.

2. The device of a rake, which, for purposes of transportation, may be raised to form a part of the bed of a wagon for carrying the hay gathered thereon, substantially as and for the purposes set forth and described.

3. The combination of the unloading-rope H and gathering-rake A, or their equivalents, substantially as and for the purposes set forth and described.

4. A rake having four or more ground or carrying-wheels, so that it may be used both for raking and carrying the hay when raked.

5. A coupling-device for connecting the rear and forward parts of the machine, substantially as described.

6. The combination of the rake A, hoisting-lever N, and hinged clapper K, or their equivalents, substantially as and for the purposes set forth.

7. The teeth extending in rear of their supporting-axle, so that the rake and its load may be balanced upon said axle, or nearly so, substantially as and for the purposes set forth.

W. T. NICHOLS.

Witnesses:
   EDM. F. BROWN,
   A. M. STOUT.